United States Patent [19]
Stiffey et al.

[11] Patent Number: 5,143,545
[45] Date of Patent: Sep. 1, 1992

[54] ANTIFOULING MARINE COATINGS

[75] Inventors: Arthur V. Stiffey, Slidell, La.; Kevin R. Hart, Poplarville; Diane K. Arwood, Bay St. Louis, both of Miss.

[73] Assignee: The United States of America as represented by the Secretary of the Navy, Washington, D.C.

[21] Appl. No.: 668,841

[22] Filed: Sep. 20, 1991

[51] Int. Cl.$^5$ .............................................. C09D 5/16
[52] U.S. Cl. ..................................... 106/15.05; 71/67; 424/405; 424/630; 514/500; 106/18.32; 106/18.35
[58] Field of Search ............... 106/15.05, 18.32, 18.35; 424/405, 630; 514/500; 71/67

[56] References Cited

U.S. PATENT DOCUMENTS

| | | | |
|---|---|---|---|
| 4,286,988 | 9/1981 | Castelli et al. | 106/15.05 |
| 4,675,051 | 6/1987 | Baxter | 106/16 |
| 4,678,512 | 7/1987 | Grams | 106/18.32 |
| 4,865,909 | 9/1989 | Manniso | 428/251 |

OTHER PUBLICATIONS

Costerton, Ingram, and Cheng, "Structure and Function of the Cell Envelope of Gram-Negative Bacteria", Bacteriological Reviews, vol. 38, No. 1, pp. 87-110, Mar. 1974.

Primary Examiner—William R. Dixon, Jr.
Assistant Examiner—Anthony J. Green
Attorney, Agent, or Firm—Thomas E. McDonald; Alfons Kwitnieski

[57] ABSTRACT

An antifouling marine paint having an antibotic active agent which (1) is toxic to gram negative organisms of the genus Oceanospirillum, (2) is relatively insoluble in seawater to permit a slow leaching into the paint-seawater interface, and (3) is non-photolytic, i.e., is not degraded by exposure to sunlight. Further, when used with a copper base antifouling paint, the antibiotic must not be broken down by the copper in the paint. The antibotic may be selected from the group consisting of chloramphenicol, erythromycin, neomycin, and streptomycin.

8 Claims, No Drawings

ANTIFOULING MARINE COATINGS

BACKGROUND OF THE INVENTION

1. Field of the Invention

The invention relates generally to antifouling marine coatings for the submersible surfaces of boat hulls, pilings, buoys, floating or emplaced offshore platforms, submergence vehicles, navigational aids, and any marine structures where marine biofouling may be a problem. More particularly, the invention relates to antifouling marine coatings which include an antibiotic active agent.

2. Description of the Related Art

Antifouling marine coatings have been used for many years to paint the hulls of ships to prevent the attachment of fouling organisms such as barnacles and algae. Most antifouling coatings include a marine biocide which is at least slightly soluble in seawater and which is slowly and continuously introduced into the adjacent seawater over the useful life of the coating to kill or weaken fouling organisms which would otherwise attach themselves to the ship hull.

U.S. Pat. No. 4,678,512, issued Jul. 7, 1987 to Grams, describes a marine antifouling coating for surfaces contacted by seawater, having dispersed therein an effective amount of particles of a polycyclic naphthacenecarboxamide which serves as an active antifouling agent. Many of these particles are near the interface of the antifouling coating and the seawater and are continually leached by the seawater to provide an inhibitory action against marine life attaching to the coating. Also, as the coating is worn, eroded or abraded, new particles are exposed to and leached by the seawater.

U.S. Pat. No. 4,286,988, issued Sep. 1, 1981 to Castelli et al, describes a copper base antifouling paint in which a $Cu_2O$ or $Cu_2S$ biocide for marine fouling organisms is slowly leached from the paint into the adjacent seawater The paint also includes ammonium sulfate to reduce or prevent the precipitation of certain water insoluble copper salts, which, in turn, reduces the frequency at which ships must be scraped to renew the old antifouling coatings or repainted.

U.S. Pat. No. 4,675,051, issued Jun. 23, 1987 to Baxter, describes marine antifouling paints, each of which includes a film-forming binder which is gradually dissolved in seawater, a marine biocide, and a sparingly soluble pigment which may also be the marine biocide of the paint. These antifouling paints are smoothly dissolved from a ship's hull in service and allow a steady release of the biocide in the paint. Biocide pigments which may be used alone or in combination in these antifouling paints include sparingly soluble copper and zinc compounds, such as cuprous oxide, cuprous thiocyanate, zinc oxide, zinc chromate, zinc ethylene bis(dithiocarbamate), zinc dimethyl dithiocarbamate and zinc diethyl dithiocarbamate.

U.S. Pat. No. 4,865,909, issued Sep. 12, 1989 to Manniso, describes an antifouling marine coating which includes a hydrophobic microporous polymeric membrane adhered to a surface by a marine paint containing a biological toxicant known to be effective against fouling organisms, e. g., cuprous oxide. With no marine organism present on it, the microporous membrane is hydrophobic to seawater and the pores are small enough so that no water enters the membrane to contact the toxicant. When a fouling organism attaches, it penetrates the membrane pores, contacts the toxicant in the paint which has partially filled the pores, is weakened or dies, and is washed off the membrane, which again becomes hydrophobic to seawater.

The use of a tin compound as the biological toxicant in antifouling marine paints is mentioned in the above-cited Manniso U.S. Pat. No. 4,865,909 as well as in numerous other patents and publications, even though tin compounds have been abandoned as antifouling compounds by the U.S. Navy and others because of tin's extreme toxicity to fish and because of the health problems induced by tin in persons dealing with these tin compounds. However, copper has been used as a fouling deterrent since Roman times, and does not appear to be particularly hazardous to persons applying it to ship bottoms. For these reasons, most antifouling marine paints prior to the present invention have been copper-based paints, with cuprous oxide being the most widely used active antifouling agent.

In a review article entitled *Structure and Function of the Cell Envelope of Gram-Negative Bacteria* by J. W. Costerton, J. M. Ingram, and K. J. Cheng, published in BACTERIOLOGICAL REVIEWS, Vol. 38, No. 1, p. 87-110, March, 1974, it is noted that gram negative microorganisms possess a complex, multilayered cell wall, including a lipopolysaccharide (LPS)-containing outer membrane, an inner, cytoplasmic membrane, and a periplasmic space between the outer and inner membranes, with each layer including different enzymes. The outer membrane and its associated LPS function as a "molecular sieve" to prevent the passage therethrough of many antibiotics and other potentially harmful molecules. The ion exchange effect of the multiple layers of the cell wall also protects the cell by binding various ions and molecules. In addition to degradative enzymes for breaking down complex food molecules, gram-negative cell walls contain other enzymes which may be used to localize potentially toxic autotrophic reactions within the cell wall. It is suggested that inorganic substrates such as iron may be oxidized while in a complexed form in the cell wall. Because these enzymes are retained in layers of the cell wall outside the cytoplasmic membrane, their products may be readily transported into the cell or allowed to diffuse into the medium.

The period of time that conventional copper base antifouling paints are effective in preventing the attachment and growth of marine fouling organisms to ship hulls varies greatly, from about 12 months to 36 months, after which time the hull surface must be scraped and brushed to remove marine fouling organisms and materials deposited thereon. Old antifouling coatings can often be renewed by such hull cleaning operations, and only touchup painting is necessary. However, even with such periodic cleaning and touchup, the copper base antifouling paints used on ship hulls by the U.S. Navy must be completely replaced at least every five years.

SUMMARY OF THE INVENTION

Therefore, it is a primary object of the invention to provide an method of extending the effective life of antifouling marine paints.

It is a related object of the invention to provide an antifouling marine paint having an effective life greater than 36 months.

These and other objects of the invention are achieved by adding to existing types of marine paints an antibotic which (1) is toxic to gram negative organisms, and (2) is relatively insoluble in seawater to permit a slow leaching into the paint-seawater interface, and (3) is non-photolytic, i. e., is not degraded by exposure to sunlight. Further, when used with a copper base antifouling paint, this antibiotic additive must not be broken down by the copper in the paint. For example, the antibiotic chloramphenicol complies with all of these requirements, and can be used in this invention as the antibiotic additive for any marine paint.

DESCRIPTION OF THE PREFERRED EMBODIMENTS

During a field study we found microorganisms attached to the hull of a Naval ship that produced an inordinate amount of a lipopolysaccharide (LPS), a slimy material. This slimy material is quite commonly produced by marine organisms classified as gram negative spirillum or bacteria. We isolated a representative culture of the microbial population and, based on morphology and biochemical characteristics, determined that these slime-producing microorganisms were of the genus Oceanospirillum, a genus which is indigenous to almost all the world's harbors and estuaries.

Tests were made to determine the sensitivity of this Oceanospirillum species to various non-photolytic antibiotics having low solubility in water, using a sensitivity disc method similar to the Kirby-Bauer standardized single-disc method described in Bauer, Kirby, Sherris and Turck, Am. J. Clinical Pathology, 45: 493, 1966. Agar plates were prepared by pouring 10 ml of a known, commercially available, marine agar, Bacto Marine Agar 2216, onto each plate. After the plates solidified, 0.1 ml of a 24 hour culture of the slime-producing Oceanospirillum species was spread evenly over the surface of each plate, and allowed to dry. Small filter pads containing selected antibiotics were dropped on the surface of the agar of each plate, and the plates incubated for 24 hours at 20° C. The plates were then examined and zones of inhibition (an indicator of sensitivity to the antibiotic) were measured with a micrometer. The results of these tests are:

| ANTIBIOTIC | CONCENTRATION | INHIBITION (mm.) |
| --- | --- | --- |
| Erythromycin | 15 micrograms | 21.5 |
| Chlortetracycline | 30 micrograms | 0 |
| Neomycin | 30 micrograms | 11.5 |
| Streptomycin | 10 micrograms | 14.5 |
| Chloramphenicol | 20 micrograms | 18.9 |
| Penicillin | 10 units | 0 |

Chloramphenicol was selected, from among the tested antibiotics having an inhibitory effect on this Oceanospirillum species, for further testing as an additive to a copper-based antifouling marine paint. Chloramphenicol has a low solubility in water of 2.5 mg/ml, is non-photolytic, dissolves readily in the organic volatile substances in paint formulations, and is stable in solvents associated with paint manufacturing.

A series of tests were made on two steel test panels, each 13.5 cm×7.5 cm×2 mm. The first test panel was painted with one coat of a copper-based antifouling paint produced by the International Paint Company, identified by Product No. 4054 and Product Name MIL-P-15931E BLACK, A/F, F129, TY2, CL1, GR.A. The second test panel was painted with a paint which consisted of the same copper-based antifouling paint to which was added 2% by weight of chloramphenicol.

Four cylindrical, plastic, test culture vessels were used with each steel test panel in the tests performed on these test panels. Each test culture vessel was 22 mm. long and had an open bottom end with a 5 mm. inner diameter and a top end with a removable cap for opening or closing the top end of the test vessel. The bottom end of each test culture vessel was sealed to its associated test panel with melted paraffin applied about its outer periphery.

Each of the four culture vessels affixed to the first test panel and the four culture vessels affixed to the second test panel were filled with 10 ml of a known, commercially available marine broth, Bacto Marine Broth 2216. Two of the culture vessels affixed to the first test panel and two of the culture vessels affixed to the second test panel were inoculated with one loopful each of a 24-hour culture of the Oceanospirillum species. The four remaining culture vessels (two affixed to the first test panel and two affixed to the second test panel) were inoculated with one loopful each of a 24-hour culture of *Photobacterium phosphoreum*, a bioluminescent bacterium.

The first test panel was incubated at 20° C. for 48 hours at which time the sliming organisms had developed a sticky, slimey layer on the bottom of the culture vessels previously inoculated with Oceanospirillum. The other two culture vessels containing the media that had been inoculated with *Photobacterium phosphoreum* did not show any evidence of growth or bioluminescence. At this time the culture medium containing the slime bacteria was poured off the surface of the slime layer and replaced with fresh medium. The new medium was inoculated with a loopful of a 24-hour culture of *Photobacterium phosphoreum* and incubated for 24 hours at 20° C. On examination both vessels were bioluminescent. These test results indicate that the slime bacteria formed a barrier which prevented toxic levels of copper from diffusing upwards into the culture medium and inhibiting the bioluminescent bacteria.

The second test panel was also incubated at 20° C. for 24 hours, then examined. The two culture vessels inoculated with Oceanospirillum developed no slimey layer and showed no evidence of growth or activity. Similarly, the two culture vessels inoculated with *Photobacterium phosphoreum* showed no evidence of growth or bioluminescence. These test results indicate that the slime bacteria Oceanospirillum was either killed or at least so completely inhibited by the small quantity of chloramphenical leaching into the media within the culture vessels that no LPS barrier layer was produced on the surface of the paint being tested.

By preventing the formation of an LPS barrier layer on the painted hull of a ship, the addition of chloramphenicol to a copper-based antifouling marine paint applied to the ship hull eliminates the need to "renew" the antifouling paint by scraping or brushing off marine organisms such as barnacles. Thus, the effective life of the antifouling paint is extended to the life of the copper compound additive, i. e., until the paint is completely depleted of copper.

The antibiotic chloramphenicol could be utilized an the sole active ingredient in an antifouling marine paint. The chief advantage of using both cuprous oxide and chloromphenicol as the active ingredients in an antifouling marine paint lies in the fact that cuprous oxide is much less soluble in water than chloramphenicol, so the combination has a much longer effective life than either one alone.

Other antibiotics could be used in a copper-based antifouling marine paint instead of chloramphenicol, so long as the antibiotic is toxic to gram negative organisms, is relatively insoluble in sea water, and is not broken down by the copper in the paint. For example, erythromycin, neomycin, or streptomycin could be used in place of chloramphenicol.

Also, any antibiotic which is toxic to gram negative organisms and which is relatively insoluble in seawater can be used with an antifouling marine paint having a metallic compound marine biocide other than a copper compound, e. g., tin or zinc compounds, so long as the antibiotic is not broken down by the metallic compound biocide.

There are many changes, modifications, and additions to the invention which would be obvious to one skilled in the art. For example, an antibiotic which is toxic to gram negative organisms and which is relatively insoluble in sea water could be added to any of the various known antifouling marine paints described above as related art, so long as the antibiotic was not broken down by an other marine biocide in the paint. Therefore, it is intended that the scope of the invention be limited only by the appended claims.

What is claimed is:

1. An antifouling marine coating having dispersed therethrough an antifouling effective amount of antibiotic material which is toxic to gram negative, LPS-producing microorganisms of the genus Oceanospirillum, and which is selected from a group consisting of erythromycin, neomycin, streptomycin, and chloroamphenicol.

2. An antifouling marine coating, as described in claim 1, which further comprises an antifouling effective amount of a metallic compound marine biocide which will not break down the antibiotic material interspersed with it.

3. An antifouling marine coating, as described in claim 2, wherein the metallic compound marine biocide is a copper compound.

4. An antifouling marine coating, as described in claim 3, wherein the copper compound marine biocide is cuprous oxide.

5. An antifouling marine coating, as described in claim 4, wherein the antibiotic material is chloramphenicol.

6. An antifouling marine coating, as described in claim 1, wherein said antifouling marine coating consists of a copper-based antifouling paint to which is added two percent by weight of chloramphenicol.

7. An antifouling marine coating, as described in claim 6, wherein said copper-based antifouling paint is MIL-P-15931E BLACK, A/F, F129, TY2, CL1, GR.A. paint.

8. An antibiotic marine coating, as described in claim 1, wherein said antibiotic material is non-photolytic.

* * * * *